United States Patent

[11] 3,603,610

| [72] | Inventor | Tom H. Thompson<br>Dearborn, Mich. |
|---|---|---|
| [21] | Appl. No. | 785,656 |
| [22] | Filed | Dec. 20, 1968 |
| [45] | Patented | Sept. 7, 1971 |
| [73] | Assignee | Clifford W. Mezey<br>Bloomfield Hills, Mich.<br>a part interest |

[54] VEHICLE SUSPENSION APPARATUS
39 Claims, 3 Drawing Figs.

[52] U.S. Cl............................................. 280/124 F,
267/34, 267/60
[51] Int. Cl........................................................ B60g 11/58
[50] Field of Search........................................... 280/124 F;
267/34, 64, 60

[56] References Cited
UNITED STATES PATENTS

| 3,414,278 | 12/1968 | Schmid.......................... | 267/34 X |
| 3,290,035 | 12/1966 | Enke............................... | 267/34 X |
| 3,147,966 | 9/1964 | Axthammer................... | 280/124 F |
| 3,110,485 | 11/1963 | Axthammer................... | 280/124 F |
| 2,592,391 | 12/1947 | Butterfield.................... | 267/60 X |
| 2,511,254 | 6/1950 | Fulton............................ | 267/60 |
| 3,150,867 | 9/1964 | Droegkamp................... | 280/124 F |
| 3,331,599 | 7/1967 | Polhemus...................... | 267/34 |

*Primary Examiner*—Philip Goodman
*Attorney*—Barnard, McGlynn & Reising

ABSTRACT: Vehicle suspension apparatus including a plurality of springs in series for supporting the sprung mass of a vehicle on the unsprung mass thereof, and means for increasing the spring rate of the series of springs in response to increases in static load on the series of springs. Hydropneumatic means cooperates with one spring of the series to resiliently resist movement of a pair of relatively movable members toward each other, and responds to static deflection of the associated spring caused by such movement to restore the members to a minimum spacing and the spring to a corresponding minimum static length, and thereafter provides increased resistance to subsequent deflection of the spring from the minimum length until the static load on the series of springs is reduced.

VEHICLE SUSPENSION APPARATUS

This invention relates to suspension apparatus for automobiles and similar vehicles, and is particularly concerned with vehicle suspension apparatus in which increases in the static loading on the vehicle causes an automatic response of the suspension apparatus to increase the resistance of the suspension apparatus to movement of the sprung mass of the vehicle toward the unsprung mass thereof.

Automobiles must be provided with suspension devices designed to provide resilient support for the sprung mass of the vehicle on the unsprung mass thereof under varying static loading conditions in order to provide reasonable riding quality under different loading conditions. If the vehicle is lightly loaded, for example, the suspension apparatus must be capable of yielding readily to shock loads such as occur when the vehicle encounters a bump or depression in the roadway. However, the suspension apparatus must be capable of supporting the vehicle unsprung mass under different, or heavier, static load conditions. If, for example, the suspension apparatus is such that yielding will occur only under heavy static loading, or only in response to high shock loads, the riding quality will be extremely poor when the vehicle is lightly loaded. Under such conditions, the suspension apparatus would be too stiff to provide adequate riding quality for the unloaded vehicle.

Conversely, if the suspension apparatus is designed to yield readily when the vehicle is lightly loaded in order to give good riding quality, it may be frequently overloaded when the vehicle static loading is increased, or under high dynamic shock loads such as would occur when the vehicle strikes a bump at fairly high speeds. The sprung mass of the vehicle under such conditions may "bottom out" frequently causing severe shock loading of the suspension system and the vehicle structure, and discomfort to occupants of the vehicle.

The usual approach to this problem is to provide a suspension system having a constant spring rate chosen to produce the desired riding quality under average static load conditions. The suspension system may include a hydraulic device for maintaining a particular riding height of the vehicle sprung mass. In such conventional systems, when the suspension system is deflected by static load on the sprung mass, the sprung mass may be hydraulically raised relative to the suspension springs to maintain riding height, but there will, of course, be a greater tendency for the suspension springs to "bottom out," or be completely contracted or collapsed under dynamic shock loading such as would occur when the vehicle strikes a bump or depression in the road surface.

Another problem encountered frequently in this type of suspension system is that of lubricating the sliding parts, such as pistons and cylinders, which may not come in contact with hydraulic oil unless the vehicle carries a certain minimum load. When the vehicle travels with lighter loads, oscillation of the sprung mass relative to the unsprung mass causes these parts to reciprocate relative to each other which results in undue wear due to the lack of lubrication. Consequently, a vehicle that is more often lightly loaded may have a high rate of failure of its suspension system due to the lack of adequate lubrication.

An object of this invention is to provide suspension apparatus for vehicles wherein the stiffness of the suspension apparatus, or its resistance to deflection, increases with the static loading on the vehicle.

A further object is to provide vehicle suspension apparatus wherein the spring rate of a plurality of springs in series is increased in response to increases in the static load on the series of springs.

Another object is to provide vehicle suspension apparatus wherein at least one spring of a series of springs is maintained at a preselected minimum static length by a hydropneumatic displacement resisting means operable to provide increased resistance to subsequent deflection of said one spring until the static load on the series is reduced to thereby increase the spring rate of the series of springs.

Another object lies in the provision of vehicle suspension apparatus including a plurality of springs in series for supporting the sprung mass of a vehicle on the unsprung mass thereof and hydropneumatic means having an extensible and contractable pressure chamber containing a compressible pneumatic fluid with means responsive to contraction of the pressure chamber upon static deflection of one of the springs of the series to introduce an incompressible hydraulic fluid in the pressure chamber to reduce the volume available to the compressible fluid to cause the pressure chamber to extend and restore the one spring to a minimum length and provide increased resistance to subsequent deflection thereof until the static load on the series is reduced to thereby increase the stiffness of the series of springs.

Still another object is to provide vehicle suspension apparatus adapted to be interposed between a pair of relatively movable members for resiliently maintaining the relatively movable members at a preselected minimum spacing under static conditions and operable to increase the resistance to movement of the relatively movable members from the minimum spacing when the static load increases.

A still further object is to provide vehicle suspension apparatus including a spring and hydropneumatic means cooperatively engaged between a pair of relatively movable members such that forces tending to move the relatively movable members toward each other will cause the spring to deflect wherein the hydropneumatic means is responsive to static displacement of the members toward each other from the minimum spacing to restore the minimum spacing and the spring to a corresponding length and at the same time provide increased resistance to subsequent movement of the members toward each other.

Another object is to provide vehicle suspension apparatus including a spring and hydropneumatic means adapted to cooperatively resiliently resist movement between a pair of relatively movable members wherein the hydropneumatic means is operable in response to static load causing deflection of the spring beyond a predetermined amount to remove the deflection of the spring in excess of the predetermined amount and at the same time provide increased resistance to deflection until the static load is reduced.

Another object is to provide vehicle suspension apparatus including hydropneumatic means having an extensible and contractable pressure chamber containing a compressible pneumatic fluid, and having means for introducing an incompressible hydraulic fluid into the pressure chamber when the pressure chamber contracts to less than a predetermined minimum size to further reduce the volume available to the incompressible fluid and thereby increase the pressure and extend the pressure chamber to the minimum size, the increased pressure due to the presence of the hydraulic fluid causing increased resistance to subsequent contraction of the pressure chamber.

The foregoing, and other objects, are achieved in accordance with the present invention by the provision of vehicle suspension apparatus including a plurality of springs in series for supporting the sprung mass of a vehicle on the unsprung mass thereof with means for increasing the spring rate of the series of springs when the static load on the springs increases. Static displacement-resisting means is responsive to static deflection of at least one spring of the series from a predetermined minimum length to restore the spring to its minimum length, and is thereafter operable to provide increased resistance to subsequent deflection of the spring until the static load on the series is reduced.

In accordance with the invention, the static displacement-resisting means includes a hydropneumatic unit having a pressure chamber containing air or some other compressible pneumatic fluid. The pressure chamber expands and contracts with the deflection of one of the springs in the series, this spring being engaged between two relatively movable members defining spring seats together with the hydropneumatic unit such that movement of the spring seat members toward each other deflects the spring and contracts the pressure chamber. Dynamic oscillation between the members causes hydraulic fluid to be transferred from a reservoir to a pressurized accumulator chamber. Static deflection of the spring seats toward each other caused by increased static loading of the suspension apparatus connects the pressurized accumulator chamber with the pressure chamber, and hydraulic fluid is forced into the pressure chamber to further compress the pneumatic fluid until the pressure chamber extends sufficiently to disconnect the pressure chamber from the accumulator chamber. When the pressure chamber is extended in this manner, the pneumatic fluid is under greater pressure due to the presence of the hydraulic fluid which reduces the volume available to the pneumatic fluid. Consequently, greater force is required to move the seat members toward each other and the stiffness of the suspension apparatus is thereby increased. When the static load on the springs is reduced, the resulting expansion of the pressure chamber causes a normally closed exhaust valve to open and connect the pressure chamber with the reservoir to drain hydraulic fluid from the pressure chamber.

The invention thus contemplates increasing the stiffness of a portion of a spring or series of springs of vehicle suspension apparatus in accordance with increases in static loading on the vehicle to thereby change the spring rate of the suspension apparatus such that greater force is required to subsequently move the sprung mass of the vehicle toward the unsprung mass.

Other objects, advantages and features of the invention will become apparent from the following description taken in connection with the accompanying drawings in which.

Figure 1:
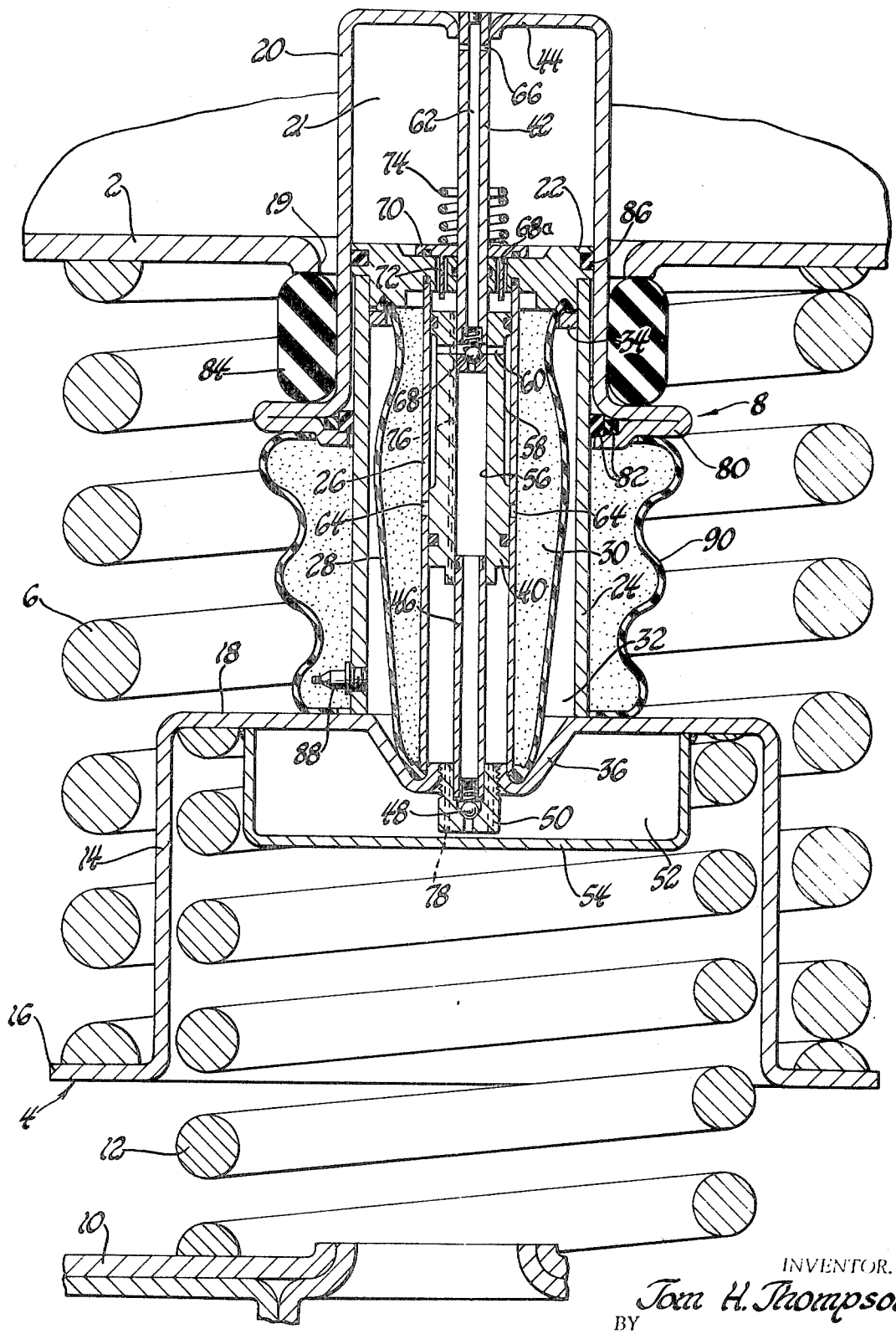
FIG. 1 is a sectional view of suspension apparatus embodying the present invention.

FIG. 1 illustrates vehicle suspension apparatus comprising spring means including springs 6 and 12 in series for supporting the sprung mass 2 of a vehicle above the unsprung mass 10, with means in the form of a hydropneumatic unit designated collectively by reference numeral 8 operable to increase the spring rate of the series of springs in response to increases in static load on the series of springs. The sprung mass 2 of the vehicle defines a spring seat member for one end of spring 6, and the unsprung mass or axle 10 defines a spring seat member for one end of spring 12. A spring seat member designated collectively by reference numeral 4 supports the lower end of spring 6 and the upper end of spring 12. Spring seat member 4 is of inverted cup shape and has a cylindrical body 14 with an outwardly extending flange 16 and a base portion 18. Spring 6 has its lower end supported on flange 16, and spring 12 has its upper end supported on the lower side of base 18.

The hydropneumatic device 8 includes a cylinder member 20 engaged with the sprung mass or seat member 2, and a piston member 22 engaged with and supported by the spring seat member 4. Piston member 22 is telescopically received in the cylinder member 20 to define with cylinder member 20 an expansible and contractable pressure chamber 21. Cylinder 20 projects through an opening 19 in the member 2. The pressure chamber 21 contains a compressible pneumatic fluid such as air for urging the pressure chamber to expand against forces tending to move members 2 and 4 toward each other. Secured to piston member 22 is an outer sleeve or casing member 24 which is welded or otherwise secured at one end to piston 22 and is welded or otherwise secured at its other end to the base portion 18 of seat member 4. An inner sleeve 26 concentric with the outer sleeve 24 is secured at one end to piston 22 and at its other end to the seat member 4, and a flexible, relatively nonstretchable membrane 28 mounted between piston member 22 and seat member 4 divides the space between the inner and outer sleeves into a charging chamber 32 and an accumulator chamber 30. The charging chamber 32 is filled with a gas under pressure to thereby urge the flexible wall or membrane 28 toward the inner sleeve 26. The flexible membrane 28 is secured at its upper end to piston member 22 by a clamping member 34 and is clamped at its lower end between the inner sleeve member 26 and a dished or recessed portion 36 of the base portion 18 of seat member 4.

The hydropneumatic device 8 further includes a control member 40 movable in response to relative movement between members 2 and 4 for controlling communication between the accumulator chamber 30 and pressure chamber 21. Control member 40 has a stem 42 secured to the end wall 44 of cylinder 20. Projecting upwardly from the dished portion 36 of seat member 4 is an intake tube 46 which is mounted in a check valve fitting 50 threadedly received in an opening in the dished portion 36 of the seat member 4. The fitting 50 is provided with a central opening which communicates with a reservoir 52 defined by a casing 54 mounted on the underneath side of base 18. Communication between the reservoir 52 and intake tube 46 is controlled by a check valve 48 mounted in the valve fitting 50. Formed in control member 40 is a central cylindrical opening 56 which slidably receives the intake tube 46. Incompressible hydraulic fluid is contained in the reservoir 52, and the control member 40 is reciprocable in response to dynamic oscillation between the piston and the cylinder members 20 and 22 to transfer hydraulic fluid from reservoir 52 to the accumulator chamber 30.

The control member 40 has a reduced diameter portion 58 between its ends which communicates with cross ports 60 in the control member 40, and communication between the cross ports 60 and the cylindrical opening 56 is controlled by a check valve 68. The cross ports 60 communicate behind the check valve 68 with a passage 62 formed in the stem 42. A plurality of ports 64 are formed in the wall of the accumulator chamber defined by the inner sleeve member 26. Thus, the reduced portion 58 of control member 40, cross ports 60 and passage 62 constitute a check valve controlled delivery passage for conducting hydraulic fluid from the intake tube 46. The intake tube 46 controlled by check valve 48 is slidably engaged with the control member 40 for conducting hydraulic fluid from reservoir 52 in response to reciprocation of the control member 40 relative thereto. Ports 64 are operable to connect the accumulator chamber with the delivery passage when members 2 and 4 move toward each other to axially displace control member 40 in the inner sleeve 26 until the ports 64 register with the reduced diameter portion 58 of the control member.

As the vehicle travels over a road, the dynamic oscillation between the members 2 and 4 causes control member 40 to reciprocate relative to the intake tube 46. Upward movement of control member 40 relative to intake tube 46 causes hydraulic fluid to be withdrawn from the reservoir 52 around check valve 48 and into the intake tube 46 as well as the cylindrical opening 56. On the return or downward stroke of control member 40, check valve 68 is unseated and the fluid is forced from the intake tube 46 and opening 56 into the delivery passage controlled by check valve 68. When the ports 64 register with the reduced diameter portion 58, the fluid is forced from the delivery passage into the port 64 to charge the accumulator chamber 30.

Restricted ports 66 formed in the upper end of stem 42 provide communication between the delivery passage and pressure chamber 21 such that the accumulator chamber 30 is connected with pressure chamber 21 when the delivery passage communicates with the ports 64 in the wall of the accumulator chamber. Accordingly, should the static loading on the sprung mass of the vehicle increase sufficiently to cause cylinder member 20 to move downwardly towards seat member 4 and bring ports 64 into communication with the reduced diameter portion 58 of control member 40, the accumulator pressure will cause the incompressible hydraulic fluid to flow from the accumulator chamber 30 through ports 64 into the delivery passage defined by the reduced diameter portion 58, cross port 60 and passage 62, through ports 66 into chamber 21. The introduction of the incompressible hydraulic fluid into the pressure chamber 21 will cause the pressure exerted by the pneumatic fluid contained therein to increase due to the reduction in volume available to the pneumatic fluid until the cylinder member 20 is forced to return to its original position to disconnect ports 64 from the delivery passage. During dynamic oscillation of the cylinder member 20 relative to piston member 22 causing pumping of fluid from the reservoir 52 into the delivery passage, the greater proportion of the fluid in the delivery passage will be pumped into the accumulator chamber 30 due to the fact that the ports 64 are large relative to the ports 66. That is to say, the ratio of the size of port 64 to the size of port 66 is such that the fluid will pass from delivery passage into the accumulator chamber 30, with some of it being squirted through ports 66 into chamber 21 to maintain lubrication. Furthermore, the size of ports 66 relative to ports 64 is such that there is a dashpot action when the cylinder member 20 moves downwardly relative to piston 22.

A plurality of exhaust ports 68a for pressure chamber 21 are formed in the piston member 22 and are normally closed by an exhaust valve 70 having a plurality of actuating fingers 72, each of which projects through one of the exhaust ports 68a. The pressure in chamber 21 normally maintains the exhaust valve 70 in a closed position to prevent escape of hydraulic fluid from the pressure chamber. When the size of pressure chamber 21 is small, a spring 74 surrounding stem 42 resiliently reacts between the end wall 44 and valve 70 to yieldably urge the valve to its closed position. The fingers 72 project beyond the lower side of piston 22 and are engageable by the upper end of control member 40. Therefore, when the static loading is reduced, member 2 will move upwardly relative to seat member 4 until the upper end of plunger 40 engages the actuating finger 72 and unseats the exhaust valve 70 from the exhaust ports 68 permitting the hydraulic fluid to drain into the inner sleeve 26. A drain passage 76 is formed in plunger 40 and the hydraulic fluid passes through the drain passage 76 into the space below control member 40 between the inner sleeve 26 and the intake tube 46. Drain passages 78 in the valve fitting 50 connect the space between the intake tube 46 and inner sleeve 26 with the reservoir 52 to provide a return passage for the hydraulic fluid to the reservoir.

Cylinder member 20 is formed with an outwardly extending flange 80 having an internal groove therein for receiving sealing members 82 engaging the outer wall of the casing or outer sleeve 24. A resilient gasket 84 is mounted between the upper side of flange 80 and the downwardly turned flange of opening 19 of the body member or sprung mass 2. An O-ring seal 86 is mounted in an annular groove in piston member 22 to provide a seal between the piston and cylinder wall. Mounted in the outer sleeve 24 near the lower end thereof is a fitting 88 for injecting an inert gas under pressure into chamber 32 to pressurize the accumulator chamber 30.

In use, the reservoir 52 is filled with incompressible hydraulic fluid and chamber 32 is charged with an inert gas under pressure to urge the membrane 28 toward the inner sleeve 26. Air or other pneumatic fluid is contained in the pressure chamber 21. When the vehicle is first driven, oscillation between the sprung and unsprung masses 2, 10 caused by undulations in the road surface will cause member 2 to move rapidly toward and away from the spring seat member 4 thus causing corresponding reciprocation of control plunger 40 relative to the intake tube 46 to withdraw hydraulic fluid from reservoir 52 into the delivery passage, and from the delivery passage into the accumulator chamber 30 to charge the accumulator chamber. The size of the accumulator chamber defined by the outer surface of the inner sleeve 26 and the flexible membrane 28 is such that the entire contents of the reservoir 52 can be contained therein. An increase in the static load on the vehicle will cause the unsprung mass 2 to move downwardly toward the sprung mass 10 and toward the spring seat member 4. As a result, the air in chamber 21 will be compressed and cylinder 20 will move downwardly relative to piston 22 until ports 64 come into registry with the reduced diameter section 58 of control member 40. When the accumulator chamber 30 is charged with hydraulic fluid, fluid will then flow through the delivery passage to ports 66 and into chamber 21. The incompressible hydraulic fluid will be introduced into chamber 21 until the pressure is sufficient to overcome the increased static load and return member 2 to its position relative to the spring seat member 4, at which point control member 40 will be in the approximate position shown in FIG. 1 with ports 64 closed to disconnect the accumulator chamber 30 from the pressure chamber 21. The increased pressure in chamber 21 will thus provide increased resistance to subsequent movement of member 2 toward member 4 and the entire suspension system will thus be stiffened due to the increased static loading of the vehicle. When the vehicle is subsequently unloaded, the increased pressure in chamber 21 will cause member 2 to move upwardly relative to the member 4 until the upper end of plunger 40 strikes the fingers 72 to drain the hydraulic fluid from chamber 21 through passages 76 and 78 into the reservoir. Continued driving of the car will, of course, recycle the fluid back into the accumulator chamber 30 from reservoir 52.

Thus, it is apparent that spring 6 and the hydropneumatic means 8 cooperatively resiliently resist relative movement between members 2 and 4 with the hydropneumatic means 8 being operable in response to static load causing deflection of spring 6 beyond a minimum amount determined by the position of control member 40 relative to ports 64 to remove the deflection of the spring in excess of the predetermined minimum amount and at the same time provide increased resistance to deflection until the static load is reduced. The hydropneumatic means 8 constitutes static displacement-resisting means responsive to deflection of spring 6 of the series of springs 6 and 12 from a predetermined minimum length to restore spring 6 to the predetermined minimum length and provide increased resistance to subsequent deflection of spring 6 from its minimum length until the static load on the series of springs 6 and 12 is reduced. Stated another way, the spring seat members 2 and 4 are maintained at a minimum spacing determined by the static position of control member 40 relative to the accumulator chamber ports 64. The hydropneumatic device 8 resists static displacement of member 2 relative to member 4 from the minimum spacing in cooperation with spring 6. When the static load causes member 2 to move toward member 4 to compress spring 6 and contract chamber 21, the members 2 and 4 are forced to return to the minimum spacing by the introduction of hydraulic fluid into chamber 21. The resultant pressure increase in chamber 21 provides increased resistance to movement of members 2 and 4 toward each other and thereby increase the spring rate of the series of springs 6 and 12.

It is a characteristic of a pair of springs in series that the spring rate of the series is less than the spring rate of each individual spring in the series. This phenomenon may be expressed mathematically as K equals $k1 \times k2/k1+k2$ where K is the combined spring rate of the series of springs, $k1$ is the spring rate of one spring, and $k2$ is the spring rate of the other spring of the series.

Let it be assumed that the spring 6, which may be referred to as a sensing spring, has a spring rate of 500 pounds per inch, and that spring 12, which may be referred to as the main spring, has a spring rate of 800 pounds per inch. According to the above relationship, the combined spring rate of springs 6 and 12 will thus be approximately 300 pounds per inch. As incompressible hydraulic fluid is introduced into chamber 21 to increase the pressure of the compressible fluid contained therein, a greater force is required to deflect the sensing spring 6. Consequently, not only is the spring rate of spring 6 increased, that is, a greater force is required to deflect spring 6, but the spring rate of the series made up of springs 6 and 12 is increased. As more and more hydraulic fluid is introduced into chamber 21, the spring rate of spring 6 increases and spring 6, in combination with the hydropneumatic device 8 ultimately approaches a solid member. In the event of overload sufficient to cause chamber 21 to be substantially filled with incompressible hydraulic fluid, spring 6 will become substantially ineffective as a spring and will be, in effect, a solid member. In this case, the spring rate of the suspension system will immediately become that of a main spring 12 or 800 pounds per inch. Thus, when the static loading on the vehicle is sufficient to cause chamber 21 to be substantially filled with incompressible hydraulic fluid, the spring rate may instantaneously increase from 300 pounds per inch to 800 pounds per inch in the foregoing illustrative example.

Figure 2:
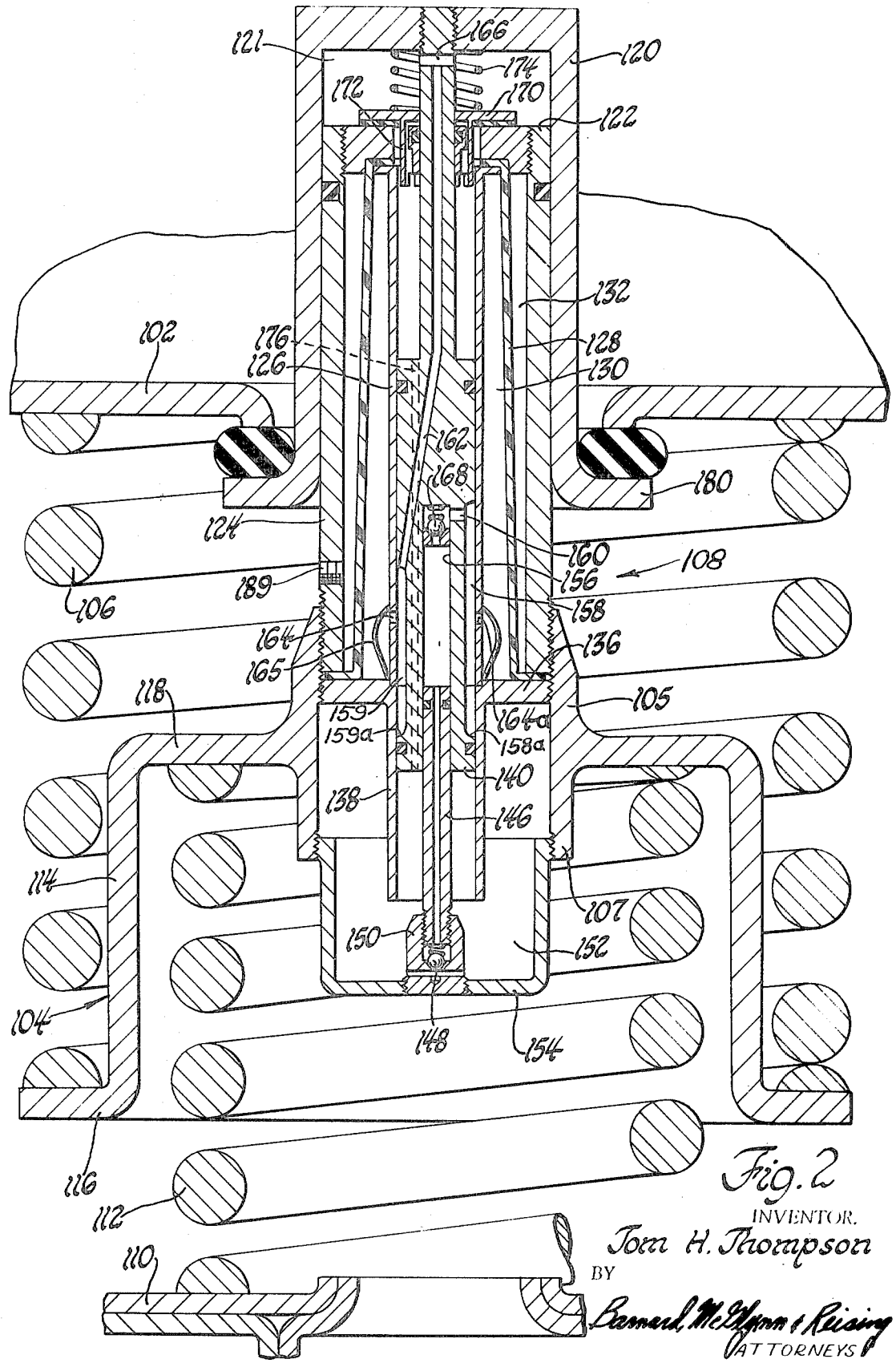
FIG. 2 is a sectional view of a second embodiment of the invention.

FIG. 2 illustrates a second embodiment of the invention wherein vehicle suspension apparatus comprises a plurality of springs 106 and 112 in series for supporting the sprung mass 102 of a vehicle above the unsprung mass 110 thereof. Means in the form of a hydropneumatic device 108 increases the spring rate of the series of springs 106 and 112 when the static load on the series is increased. The sprung mass 102 constitutes the upper spring seat member for spring 106, and a spring seat member 104 constitutes the lower spring seat member for spring 106. Spring seat member 104 includes a cylindrical body portion 114 with an outwardly extending flange 116 and a base portion 118. Base portion 118 is formed with an upwardly extending skirt portion 105 and a depending skirt portion 107. The unsprung mass 110 constitutes a spring seat for the lower end of spring 112, and the upper end of spring 112 is seated against the lower side of base portion 118.

The hydropneumatic device of the embodiment of FIG. 2 includes a cylinder member 120 with a piston member 122 telescopically and reciprocably received therein to define a pressure chamber 121. As in the previous embodiment, cylinder member 120 projects through an opening in the sprung mass 102. Secured to and depending from piston member 122 is an outer sleeve 124 which has its lower end threadedly mounted in the upwardly extending skirt 105 of seat member 104. The upper end of sleeve 124 is threaded to the outer periphery of the piston. Mounted between the lower side of piston 122 and the upper side of an annular member 136 threadedly mounted in skirt portion 105 beneath sleeve 124 is an inner sleeve 126. Formed at the upper end of the inner sleeve 126 is an outwardly extending flange which cooperates with piston 122 to clamp the upper end of a flexible, but relatively nonstretchable membrane 128. The lower end of membrane 128 is clamped between member 136 and the lower end of the outer sleeve 124. Membrane 128 divides the space between the outer and inner sleeves into a charging chamber 132 and an accumulator chamber 130.

Depending from the upper end wall of cylinder member 120 is the stem of a control member 140 slidably received in the inner sleeve 126 as well as a cylindrical extension 138 coaxial with the inner sleeve 126 and depending from annular member 136. A reservoir 152 is defined by a casing 154 threadedly mounted in the lower end of the depending skirt portion 107, and a check valve fitting 150 is mounted on the lower end wall of the reservoir. Projecting upwardly from fitting 150 is an intake tube 146 controlled by a check valve 148 in fitting 150. The intake tube 146 is slidably received in a cylindrical opening 156 formed in control plunger 140.

When control member 140 is forced downwardly as shown in FIG. 2, hydraulic fluid is delivered from intake tube 146 and opening 156 past a check valve 168 and through a cross port 160 to an axially extending groove 158 formed in the periphery of control member 140. Groove 158 communicates with an inlet port 164a formed in the inner sleeve 126 for the accumulator chamber 130. An axially extending groove 159 is formed in the periphery of control member 140 which communicates with pressure chamber 121 through a passage 162 and cross ports 166 formed in the stem of control member 140. Groove 159 communicates with an outlet port 164 in sleeve 126 for the accumulator chamber 130. During dynamic oscillation of control member 140 relative to intake tube 146, fluid is pumped from the reservoir through intake tube 146 and opening 156 past valve 168 to the accumulator chamber through cross port 160, groove 158 and inlet port 164a. When the static load causes member 102 to move toward member 104 and bring the outlet port 164 into communication with groove 159, hydraulic fluid is forced from accumulator chamber 130 through outlet port 164, groove 159, passage 162 and cross ports 166 into the pressure chamber 121. For some applications, it may be desirable for groove 159 to be reduced in length such that the lower end 159a is located above the lower end 158a of groove 158 as viewed in the drawing so that short stroke oscillations of the control member will not connect the outlet port 164 of the accumulator chamber with groove 159. Curved guard members 165 are secured to the outer wall of sleeve 126 adjacent ports 164 and 164a to prevent the flexible membrane 128 from covering the ports or otherwise interfering with flow through the ports.

An exhaust valve 170 having depending fingers 172 controls communication between pressure chamber 121 and reservoir 152 through a drain passage 176 in control member 140. A spring 174 is seated on spring 170 to engage the end wall of chamber 121 when the chamber is contracted as illustrated in FIG. 2.

Cylinder member 120 is formed with an outwardly projecting flange 180 corresponding to flange 80 of the previously described embodiment. An opening 189 for charging chamber 132 with an inert gas to pressurize the accumulator chamber 130 is provided in casing 124.

The embodiment of FIG. 2 operates in a manner similar to the embodiment of FIG. 1. Dynamic oscillation between members 102 and 104 caused by the vehicle travelling over a road surface causes reciprocation of control plunger 140 to withdraw hydraulic fluid from the reservoir through the intake tube 146 and deliver the fluid to the accumulator chamber through port 164a. Static deflection of spring 106 caused by loads on the sprung mass 102 causes hydraulic fluid to flow from the accumulator chamber through port 164 and passage 162 into pressure chamber 121 until the deflection is removed and the minimum spacing restored between members 102 and 104. When the static load is reduced, or when the upper end of control member 140 lifts exhaust valve 170 from the upper side of piston 122, hydraulic fluid is drained from pressure chamber 121 to the reservoir. The spring rate of the series including springs 106 and 112 is thus increased when the static load is increased.

Under most operating conditions, no undesirable aeration of the hydraulic fluid will take place in the pressure chamber 21 of the embodiment of FIG. 1 or 121 of the embodiment of FIG. 2. If mixing of the pneumatic and hydraulic fluids should take place in the pressure chamber, the fluids would separate when returned to the reservoir chamber. However, in situations where such mixing might be undesirable, such as in buses and trucks where heavy loading would be continuous over long periods of time, an annular- or doughnut-shaped, hollow collapsible membrane containing a quantity of air or other compressible fluid can be inserted in the pressure chambers 21 and 121 to prevent mixing of the compressible and incompressible fluids.

Figure 3:
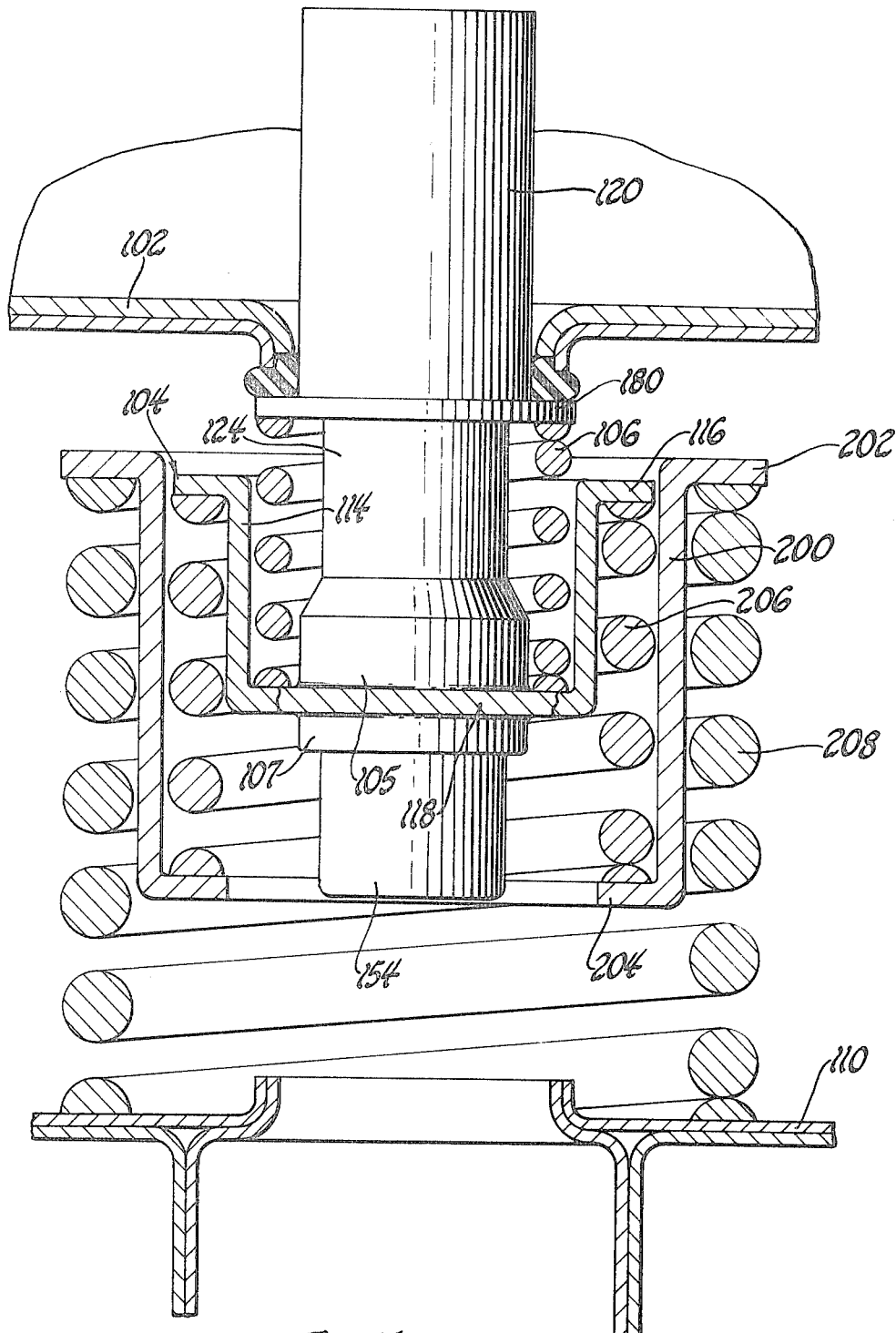
FIG. 3 is an elevational view, partially in section, of a third embodiment of the invention.

FIG. 3 illustrates a third form of the invention wherein the series of springs includes three springs, 106, 206, and 208. Spring 106 is mounted between the flange 180 of a cylinder member 120 and a spring seat member 104 which is common to springs 106 and 206. A hydropneumatic device similar to that illustrated in FIG. 2 is mounted between the sprung mass 102 and spring seat member 104. The internal structure of the hydropneumatic device of FIG. 3 is identical to that of the FIG. 2 embodiment. A second floating spring seat 200 has a flange 202 providing a spring seat for a third spring 208, and an inwardly projecting flange 204 providing the second spring seat for spring 206. The arrangement of FIG. 3 thus provides a softer ride than is possible in previously described embodiments due to the addition of the third spring. Thus, when the load-sensing device is fully loaded so as to effectively lock out spring 106 from the series of springs of the suspension system, the resulting spring rate will be the combined spring rate of springs 206 and 208 which will be somewhat less than would be the case with only a single spring involved.

While specific forms of the invention have been illustrated and described in the accompanying drawings and foregoing specification, it should be understood that the invention is not limited to the exact construction shown, but that various alternatives in the construction and arrangement of parts, all falling within the scope and spirit of the invention, will be apparent to those skilled in the art.

The embodiments of the invention in which an exclusive property or privilege is claimed are defined as follows:

1. Vehicle suspension apparatus comprising: a plurality of springs in series for supporting the sprung mass of a vehicle on the unsprung mass thereof; and means responsive to static deflection of at least one of said springs from a predetermined minimum length resulting from increases in static load on said series of springs to restore said one spring to said predetermined minimum length and increase the spring rate of said series of springs.

2. Vehicle suspension apparatus as claimed in claim 1, wherein said one spring is mounted between a pair of relatively movable members, and said means comprises static displacement-resisting means engaged between said pair of relatively movable members.

3. Vehicle suspension apparatus as claimed in claim 2 wherein said static displacement resisting means includes an extensible and contractable pressure chamber containing a compressible pneumatic fluid, and means for introducing an incompressible hydraulic fluid into said pressure chamber to reduce the volume available to the compressible fluid when the pressure chamber contracts from a selected minimum size.

4. Vehicle suspension apparatus as claimed in claim 3 wherein said pressure chamber is defined by a cylinder member and a piston member telescopically received in said cylinder member, said piston and cylinder members expanding and contracting in accordance with expansion and contraction of said one spring.

5. Vehicle suspension apparatus as claimed in claim 4 wherein said means for introducing an incompressible hydraulic fluid into said pressure chamber includes a pressurized accumulator chamber.

6. Vehicle suspension apparatus comprising: a plurality of springs in series for supporting the sprung mass of a vehicle in the unsprung mass thereof; static displacement-resisting means for increasing the spring rate of the series of springs in response to increases in static load on the series of springs; said static displacement-resisting means being responsive to static deflection of at least one spring of the series from a predetermined minimum length to restore said one spring to said predetermined minimum length and provide increased resistance to subsequent deflection of said one spring from said minimum length until the static load on the series is reduced; said static displacement-resisting means including an extensible and contractable pressure chamber containing a compressible pneumatic fluid, and means for introducing an incompressible hydraulic fluid into said pressure chamber to reduce the volume available to the compressible fluid when the pressure chamber contracts from a selected minimum size; a cylinder member and a piston member telescopically received in said cylinder member to define said pressure chamber, said piston and cylinder members expanding and contracting in accordance with expansion and contraction of said one spring; said means for introducing an incompressible hydraulic fluid into said pressure chamber including a pressurized accumulator chamber; and a control member operable in response to contraction of said pressure chamber to provide communication between said accumulator chamber and said pressure chamber.

7. Vehicle suspension apparatus as claimed in claim 6, further including a reservoir for said hydraulic fluid, said control member being operable in response to dynamic reciprocation between said piston and cylinder members to transfer hydraulic fluid from said reservoir to said accumulator chamber.

8. Vehicle suspension apparatus as claimed in claim 7 further including a check valve controlled intake tube communicating with said reservoir and slidably engaged with said control member for conducting hydraulic fluid from the reservoir in response to movement of said control member in one direction relative to said intake tube.

9. Vehicle suspension apparatus as claimed in claim 8 further including a check valve controlled delivery passage in said control member for conducting hydraulic fluid from said intake tube in response to movement of said control member in the other direction relative to said intake tube.

10. Vehicle suspension apparatus as claimed in claim 9 further including at least one port in said accumulator chamber for connecting the accumulator chamber with said delivery passage when the pressure chamber contracts.

11. Vehicle suspension apparatus as claimed in claim 10 further including at least one port providing communication between said delivery passage and said pressure chamber such that the accumulator chamber is connected with the pressure chamber when the delivery passage communicates the port in the wall of the accumulator chamber.

12. Vehicle suspension apparatus as claimed in claim 11 wherein the port in the wall of the accumulator is substantially larger than the port providing communication between the delivery passage and said pressure chamber whereby the greater portion of fluid delivered from said delivery passage during dynamic reciprocation between said piston and cylinder members will be delivered to the accumulator chamber.

13. Vehicle suspension apparatus as claimed in claim 11 further including an exhaust passage connecting said pressure chamber with said reservoir, a normally closed valve controlling said exhaust passage engageable by said control member in response to expansion of said pressure chamber beyond a maximum amount to connect said pressure chamber with said reservoir to relieve the pressure therein.

14. Vehicle suspension apparatus adapted to be interposed between a pair of relatively movable members for maintaining the relatively movable members at a preselected minimum spacing under static conditions, said suspension apparatus comprising: a spring engageable with the relatively movable members such that forces tending to move the relatively movable members toward each other will cause the spring to deflect; and hydropneumatic displacement resisting means engageable with the relatively movable members and responsive to static displacement of the members toward each other from the preselected minimum spacing to restore the preselected minimum spacing and the spring to a length corresponding to the minimum spacing, and at the same time provide increased resistance to subsequent movement of the members toward each other.

15. Vehicle suspension apparatus as defined in claim 14 wherein said hydropneumatic displacement-resisting means includes an extensible and contractable pressure chamber containing a compressible pneumatic fluid, and means for introducing an incompressible hydraulic fluid into said pressure chamber to reduce the volume available to the compressible fluid in response to contraction of said chamber from a predetermined size to thereby increase the pressure and extend the chamber.

16. Vehicle suspension apparatus as claimed in claim 15 wherein said displacement-resisting means includes a cylinder member engageable with one of the relatively movable members, and a piston member engageable with the other of the relatively movable members and telescopically received in said cylinder member to define said pressure chamber.

17. Vehicle suspension apparatus as claimed in claim 16 wherein said means for introducing an incompressible hydraulic fluid into said pressure chamber includes a pressurized accumulator chamber.

18. Vehicle suspension apparatus as claimed in claim 17 further including a control member operable in response to contraction of said pressure chamber to provide communication between said accumulator chamber and said pressure chamber.

19. Vehicle suspension apparatus as claimed in claim 18 wherein said displacement-resisting means further includes a reservoir for the hydraulic fluid, and wherein said control member is reciprocable in response to dynamic oscillation between said piston and cylinder members to transfer hydraulic fluid from said reservoir to said accumulator chamber.

20. A vehicle suspension apparatus as claimed in claim 19 further including a check valve controlled intake tube connected with said reservoir and slidably engaged with said control member for conducting hydraulic fluid from the reservoir in response to movement of said control member in one direction relative to said intake tube.

21. Vehicle suspension apparatus as claimed in claim 20 further including a check valve controlled delivery passage in said control member for conducting hydraulic fluid from said intake tube in response to movement of said control member in the other direction relative to said intake tube.

22. A vehicle suspension unit as claimed in claim 21 further including a port in said accumulator chamber for connecting the accumulator chamber with said delivery passage when the pressure chamber contracts.

23. A vehicle suspension unit as claimed in claim 22 further including a port providing communication between said delivery passage and said pressure chamber such that the accumulator chamber is connected with the pressure chamber when the delivery passage communicates with the port in the wall of the accumulator chamber.

24. A vehicle suspension unit as claimed in claim 23 further including a normally closed outlet port in said pressure chamber, and means on said control member operable to open said outlet port and connect the pressure chamber with the reservoir when the pressure chamber expands to a predetermined size.

25. Vehicle suspension apparatus comprising: spring means for supporting the sprung mass of a vehicle in the unsprung mass thereof; and static displacement-resisting means responsive to static deflection of said spring means caused by an increase in the static load of said spring means to restore at least a portion of said spring means to a predetermined static length and provide increased resistance to subsequent deflection of said portion from said minimum length.

26. Vehicle suspension apparatus as claimed in claim 25 wherein said static displacement-resisting means includes an extensible and contractable pressure chamber containing a compressible pneumatic fluid, and means for introducing an incompressible hydraulic fluid into said pressure chamber to reduce the volume available to the compressible fluid when the pressure chamber contracts from a minimum selected size.

27. Vehicle suspension apparatus as claimed in claim 26 wherein said pressure chamber is defined by a cylinder member and a piston member telescopically received in said cylinder member, said piston and cylinder members expanding and contracting in accordance with expansion and contraction of said portion of said spring means.

28. Vehicle suspension apparatus as claimed in claim 27 wherein said means for introducing an incompressible hydraulic fluid into said pressure chamber includes a pressurized accumulator chamber.

29. Vehicle suspension apparatus as claimed in claim 28, further including a control member operable in response to contraction of said pressure chamber to provide communication between said accumulator chamber and said pressure chamber.

30. Vehicle suspension apparatus as claimed in claim 29 further including a reservoir for said hydraulic fluid, said control member being operable in response to reciprocation between said piston and cylinder members to transfer hydraulic fluid from said reservoir to said accumulator chamber.

31. Vehicle suspension apparatus comprising: means defining a pair of spring seat members movable relative to each other; a spring mounted between said seat members such that movement of said seat members toward each other compresses said spring; and hydropneumatic displacement-resisting means engaged with said seat members and operable in response to static displacement of said spring seat members toward each other from a predetermined minimum spacing to restore said seat members to said minimum spacing and said spring to a length corresponding thereto, and provide increased resistance to subsequent displacement of said seat members toward each other.

32. Vehicle suspension apparatus as claimed in claim 31 further including means defining a third spring seat member movable relative to said pair of spring seat members, and a second spring mounted between one of said pair of spring seat members and said third spring seat member.

33. Vehicle suspension apparatus as claimed in claim 32 further including means defining a fourth spring seat member movable relative to said pair of spring seat members as well as said third spring seat member, and a third spring mounted between said third and fourth spring seat members.

34. Vehicle suspension apparatus including spring means and hydropneumatic means adapted to cooperatively resiliently resist relative movement between a pair of relatively movable members, said hydropneumatic means being operable in response to static load causing deflection of the spring means beyond a predetermined amount to remove the deflection of said spring in excess of the predetermined amount and at the same time provide increased resistance to deflection until the static load is reduced.

35. Vehicle suspension apparatus as claimed in claim 34 wherein said spring means comprises a coil spring and said hydropneumatic means is operable to maintain the coil spring at a preselected minimum length.

36. Vehicle suspension apparatus as claimed in claim 34 wherein said spring means comprises a plurality of springs in series.

37. Vehicle suspension apparatus comprising: a base member; a piston member; a cylindrical casing having one end secured to said piston member and its other end secured to said base member; a cylinder member telescopically receiving said piston member to define therewith an expansible and contractable pressure chamber; an inner sleeve member enclosed by said casing and having one end secured to said piston and its other end connected with said base member; a control member slidably received in said inner sleeve, said control member having a stem slidably projecting through said piston member and connected with the cylinder member; means defining a reservoir chamber in said base member; means defining an accumulator chamber in the space between said inner sleeve and said casing; and intake tube projecting from said reservoir chamber, said control member having a cylindrical opening slidably receiving said intake tube; means defining a space between the control member and said inner sleeve; a passage in said control member communicating with said space and said pressure chamber; a check valve controlling communication between said cylindrical opening and said passage; a check valve controlling communication between said reservoir and said intake tube; said check valves controlling flow such that expansion of said pressure chamber withdraws fluid from the reservoir into the intake tube and cylindrical opening, and contraction of the pressure chamber forces fluid from the cylindrical opening into said passage; at least one port in said inner sleeve for connecting said accumulator chamber with said passage when the pressure chamber contracts sufficiently to bring said port into registry with the reduced diameter portion of said control member; and normally closed exhaust valve means controlling communication between said pressure chamber and reservoir operable by said control member upon expansion of said pressure chamber to a predetermined size to connect the pressure chamber with the reservoir chamber.

38. Vehicle suspension apparatus as claimed in claim 37 wherein said base member includes a cylindrical skirt portion threadedly receiving said casing; and further including an annular plate member threadedly mounted in said skirt portion with a depending cylindrical extension coaxial with said inner sleeve, said intake tube extending into said cylindrical extension.

39. Vehicle suspension apparatus as claimed in claim 37 wherein said base member as a dished portion and said other end of said inner sleeve is mounted on said dished portion, and wherein a check valve fitting is mounted in said dished portion and said intake tube projects from said check valve fitting.